US012694095B1

(12) United States Patent
Guarrieri et al.

(10) Patent No.: US 12,694,095 B1
(45) Date of Patent: Jul. 28, 2026

(54) CYBER RECOVERY TO COMPROMISED PRODUCTION ENVIRONMENT USING MICROSEGMENTATION

(71) Applicant: Unisys Corporation, Blue Bell, PA (US)

(72) Inventors: Stephen Guarrieri, Philadelphia, PA (US); David W. Heileman, Jr., Chester Springs, PA (US); Satish Bilupati, Bangalore (IN); Senthil Kumar Balaraman, Bangalore (IN); Pramodh Mallesh Bettadapura, Bangalore (IN); Andrew Peters, Forestville, CA (US); Charles Bisom-Rapp, Dell Mar, CA (US); Lekshmanan Kathiresan, Dindigul (IN); Debadatta Sahoo, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 6 days.

(21) Appl. No.: 18/668,892

(22) Filed: May 20, 2024

Related U.S. Application Data

(60) Provisional application No. 63/467,629, filed on May 19, 2023, provisional application No. 63/467,631, filed on May 19, 2023, provisional application No. 63/467,628, filed on May 19, 2023.

(51) Int. Cl.
*G06F 21/00* (2013.01)
*G06F 21/53* (2013.01)
*G06F 21/55* (2013.01)
*G06F 21/56* (2013.01)

(52) U.S. Cl.
CPC ............ *G06F 21/53* (2013.01); *G06F 21/556* (2013.01); *G06F 21/568* (2013.01)

(58) Field of Classification Search
CPC ...... G06F 21/53; G06F 21/556; G06F 21/568; G06F 21/64; G06F 21/56; G06F 21/55; H04L 63/14
See application file for complete search history.

(56) References Cited

U.S. PATENT DOCUMENTS

| | | | |
|---|---|---|---|
| 2020/0366708 A1* | 11/2020 | Raghunathan | H04L 63/20 |
| 2021/0306386 A1* | 9/2021 | Smith | H04L 65/61 |
| 2021/0329021 A1* | 10/2021 | Shaw | H04L 63/20 |

(Continued)

*Primary Examiner* — Yogesh Paliwal
(74) *Attorney, Agent, or Firm* — SHOOK, HARDY & BACON L.L.P.

(57) ABSTRACT

A computerized method and system is provided herein for enabling recovery of critical assets to a corrupted production environment prior to resolution of a security incident responsible for the corruption. Micro-segmentation and zero trust principles are applied to a production environment and a vault environment of a cyber-recovery system. Communities of interest (COIs) are created within the micro-segmented production environment, the vault environment, and a combination thereof (i.e., some production environment components can communicate with vault components). The verified security of the components within each COI ensures that only clean data is restored from a vault clean room to a production clean room within the production environment that is corrupted from the security incident.

11 Claims, 9 Drawing Sheets

700

710 RECEIVING AN INDICATION A SECURITY INCIDENT IS OCCURRING, WHEREIN THE SECURITY INCIDENT CORRUPTS THE PRODUCTION ENVIRONMENT AND CREATES A CORRUPTED PRODUCTION ENVIRONMENT

720 IDENTIFYING A CLEAN COPY OF EACH OF A PLURALITY OF CRITICAL ASSETS, WHEREIN A CRITICAL ASSET IS AN ASSET THAT IS FLAGGED AS PRIORITIZED DURING A CYBER-RECOVERY TO RESTORE TO THE PRODUCTION ENVIRONMENT

730 DYNAMICALLY GENERATE A CLEAN ROOM IN THE CORRUPTED PRODUCTION ENVIRONMENT

740 ESTABLISHING A SECURE CONNECTION BETWEEN THE CLEAN ROOM IN THE CORRUPTED PRODUCTION ENVIRONMENT AND A CLEAN ROOM IN A VAULT

750 TRANSMITTING, TO THE CLEAN ROOM IN THE CORRUPTED PRODUCTION ENVIRONMENT, THE CLEAN COPY OF EACH OF THE PLURALITY OF CRITICAL ASSETS

(56)    References Cited

U.S. PATENT DOCUMENTS

2023/0141909 A1*  5/2023  Truscott ............. G06F 11/1469
                                                    726/23
2023/0401125 A1*  12/2023  Madan ................ G06F 11/1453
2024/0193049 A1*  6/2024  Weissman ........... G06F 9/45558
2024/0250929 A1*  7/2024  Jain .................... H04L 61/2592
2024/0256658 A1*  8/2024  Madan ................. G06F 21/566
2024/0338449 A1*  10/2024  Ezrielev ............... G06F 21/566

* cited by examiner

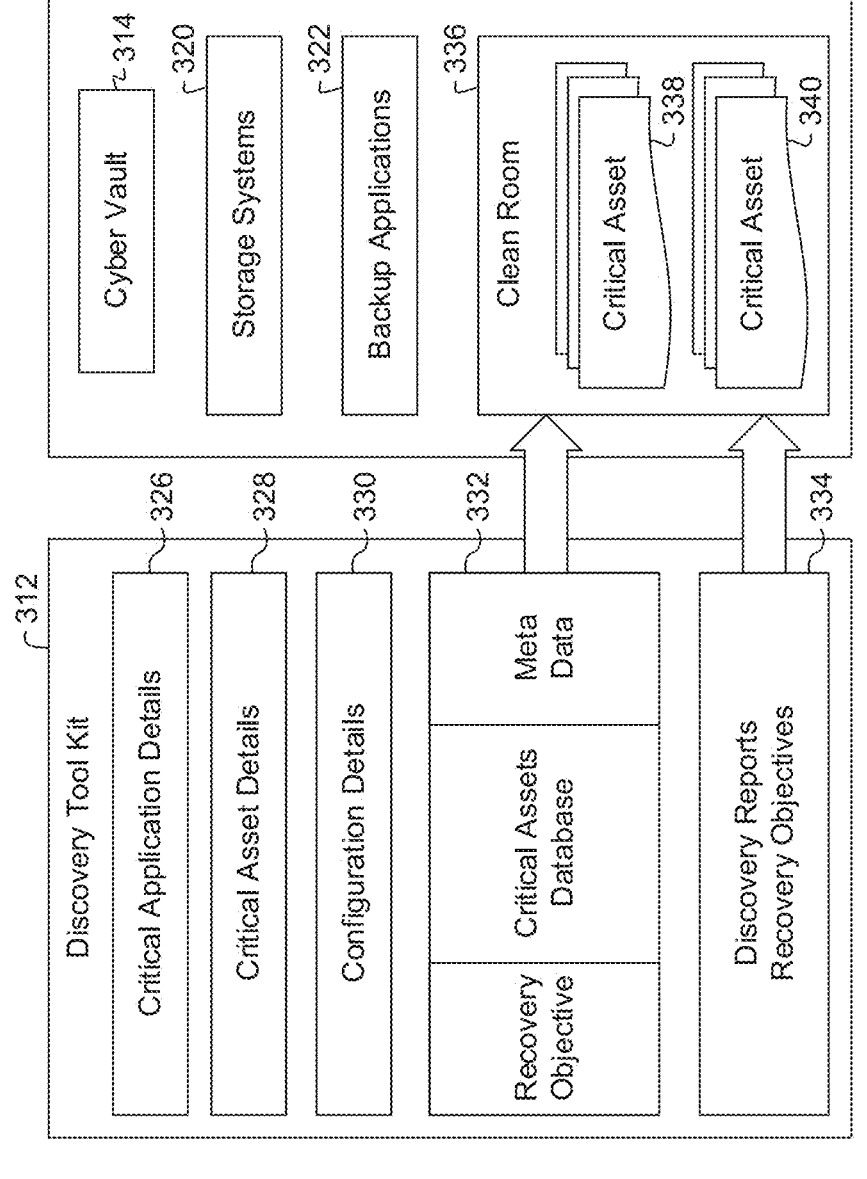
*FIG. 3*

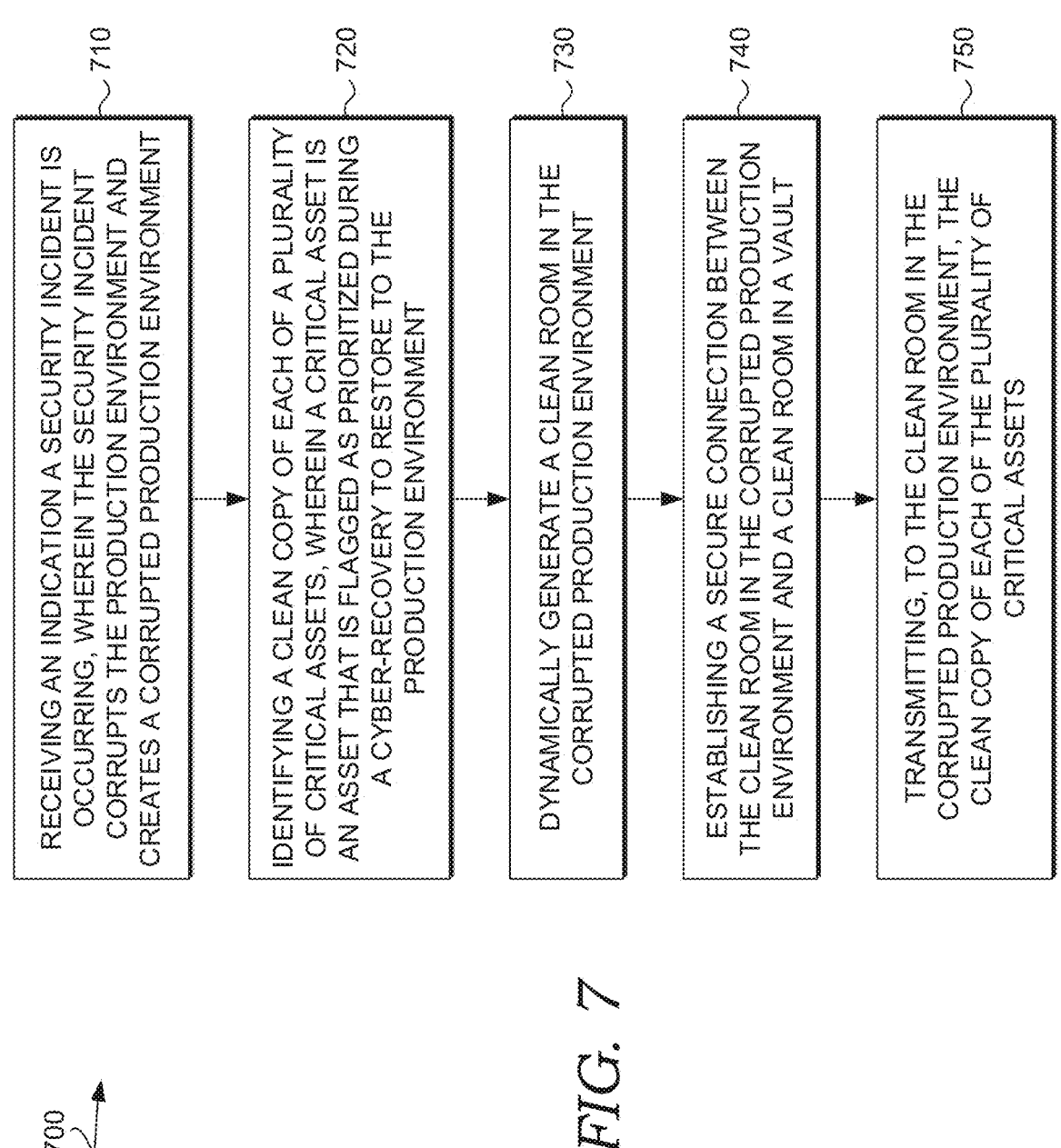

700

RECEIVING AN INDICATION A SECURITY INCIDENT IS OCCURRING, WHEREIN THE SECURITY INCIDENT CORRUPTS THE PRODUCTION ENVIRONMENT AND CREATES A CORRUPTED PRODUCTION ENVIRONMENT ~710

IDENTIFYING A CLEAN COPY OF EACH OF A PLURALITY OF CRITICAL ASSETS, WHEREIN A CRITICAL ASSET IS AN ASSET THAT IS FLAGGED AS PRIORITIZED DURING A CYBER-RECOVERY TO RESTORE TO THE PRODUCTION ENVIRONMENT ~720

DYNAMICALLY GENERATE A CLEAN ROOM IN THE CORRUPTED PRODUCTION ENVIRONMENT ~730

ESTABLISHING A SECURE CONNECTION BETWEEN THE CLEAN ROOM IN THE CORRUPTED PRODUCTION ENVIRONMENT AND A CLEAN ROOM IN A VAULT ~740

TRANSMITTING, TO THE CLEAN ROOM IN THE CORRUPTED PRODUCTION ENVIRONMENT, THE CLEAN COPY OF EACH OF THE PLURALITY OF CRITICAL ASSETS ~750

FIG. 7

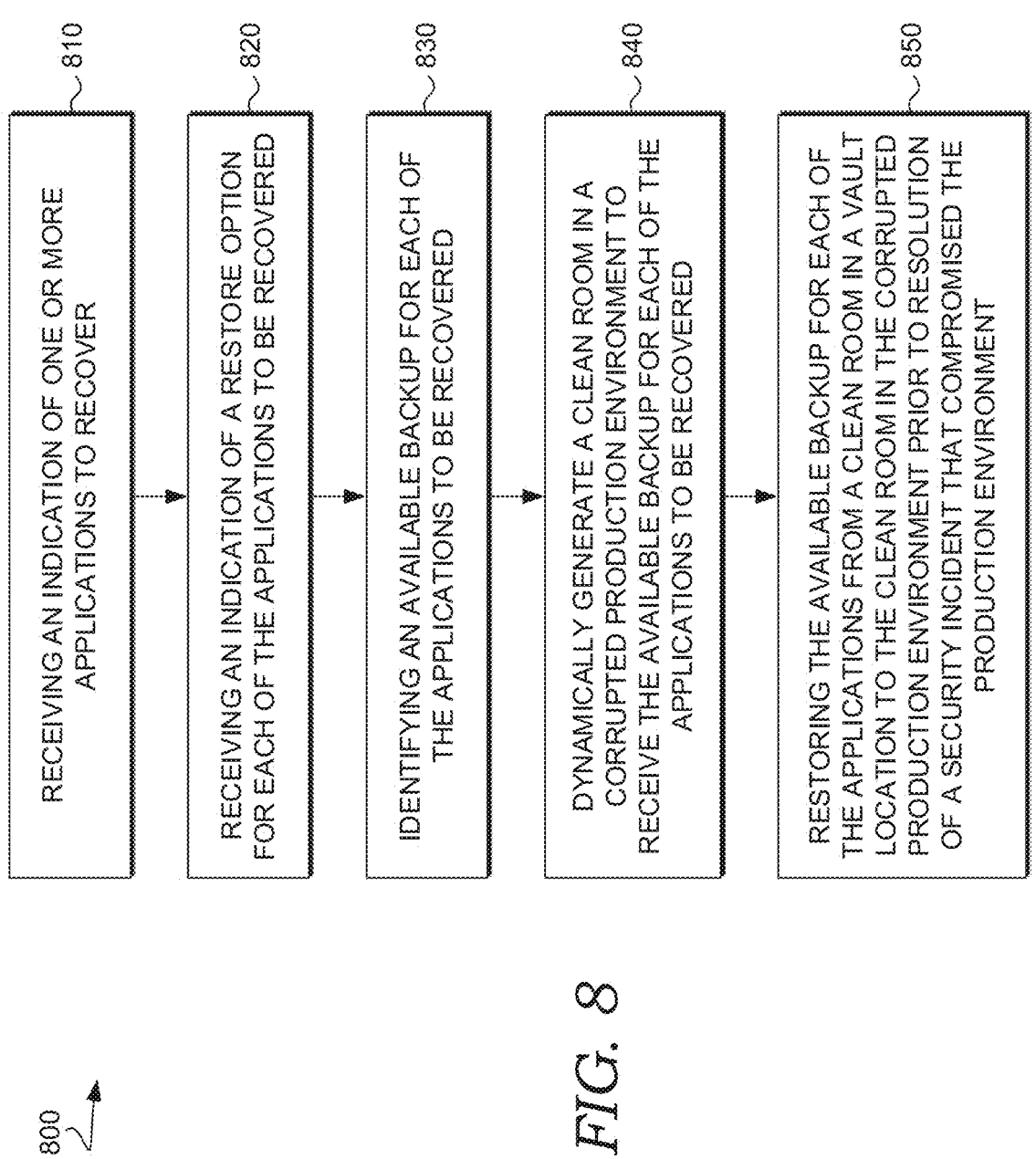

RECEIVING AN INDICATION OF ONE OR MORE APPLICATIONS TO RECOVER ⟋810

RECEIVING AN INDICATION OF A RESTORE OPTION FOR EACH OF THE APPLICATIONS TO BE RECOVERED ⟋820

IDENTIFYING AN AVAILABLE BACKUP FOR EACH OF THE APPLICATIONS TO BE RECOVERED ⟋830

DYNAMICALLY GENERATE A CLEAN ROOM IN A CORRUPTED PRODUCTION ENVIRONMENT TO RECEIVE THE AVAILABLE BACKUP FOR EACH OF THE APPLICATIONS TO BE RECOVERED ⟋840

RESTORING THE AVAILABLE BACKUP FOR EACH OF THE APPLICATIONS FROM A CLEAN ROOM IN A VAULT LOCATION TO THE CLEAN ROOM IN THE CORRUPTED PRODUCTION ENVIRONMENT PRIOR TO RESOLUTION OF A SECURITY INCIDENT THAT COMPROMISED THE PRODUCTION ENVIRONMENT ⟋850

CYBER RECOVERY TO COMPROMISED PRODUCTION ENVIRONMENT USING MICROSEGMENTATION

CROSS-REFERENCE TO RELATED APPLICATIONS

This application claims the benefit of and priority to U.S. Application No. 63/467,631, filed on May 19, 2023, entitled "MICROSEGMENTATION FOR CYBER RECOVERY", U.S. Application No. 63/467,628, filed on May 19, 2023, entitled "DISCOVERY METHOD AND TOOLING FOR CYBER RECOVERY", and U.S. Application No. 63/467,629, filed on May 19, 2023, entitled "CYBER RECOVERY ORCHESTRATION TOOL", each of which are hereby incorporated by reference in their entirety.

BACKGROUND

Today, cyber threats are increasing every day and organizations are incurring high costs to recover data that is stolen or modified by malicious software or malware. Because ransomware and destructive attacks cause significant disruption, brand damage and lost revenue, more organizations are prioritizing their most critical applications. Ransomware has taken as little as 90 seconds to breach systems and, once breached, the attacking software can work internally for months.

Additionally, the regulatory community expects/requires that recovery solutions will: provide advanced response, identify, and control damage impact, provide protection and not merely prevention of data loss or corruption, isolate core business assets, prevent extreme data destruction or contamination and, implement multiple forms of data replications and a multi-tiered approach.

In recent years, some companies have implemented cyber recovery solutions to complement Disaster Recovery Center (DRC) sites and processes. This is because it's uncertain that data in the DRC is in good condition, especially the critical assets and data. The cyber recovery solutions include a secured repository (also referred to hereinafter as the "vault") for recovery. However, ransomware attacks are evolving and even these vault-based "clean rooms" can be attacked and compromised.

SUMMARY

Cyber-recovery restore is an integral part of operations. Providing users an ability to perform a restore to a still-corrupted production environment allows client services to experience minimal downtime caused by security attacks.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 3 illustrates an example discovery tool kit environment for collecting restore information, in accordance with an aspect described herein;

FIG. 7 illustrates an example method, in accordance with an aspect described herein;

FIG. 8 illustrates an example method, in accordance with an aspect described herein.

DETAILED DESCRIPTION

Figure 1:
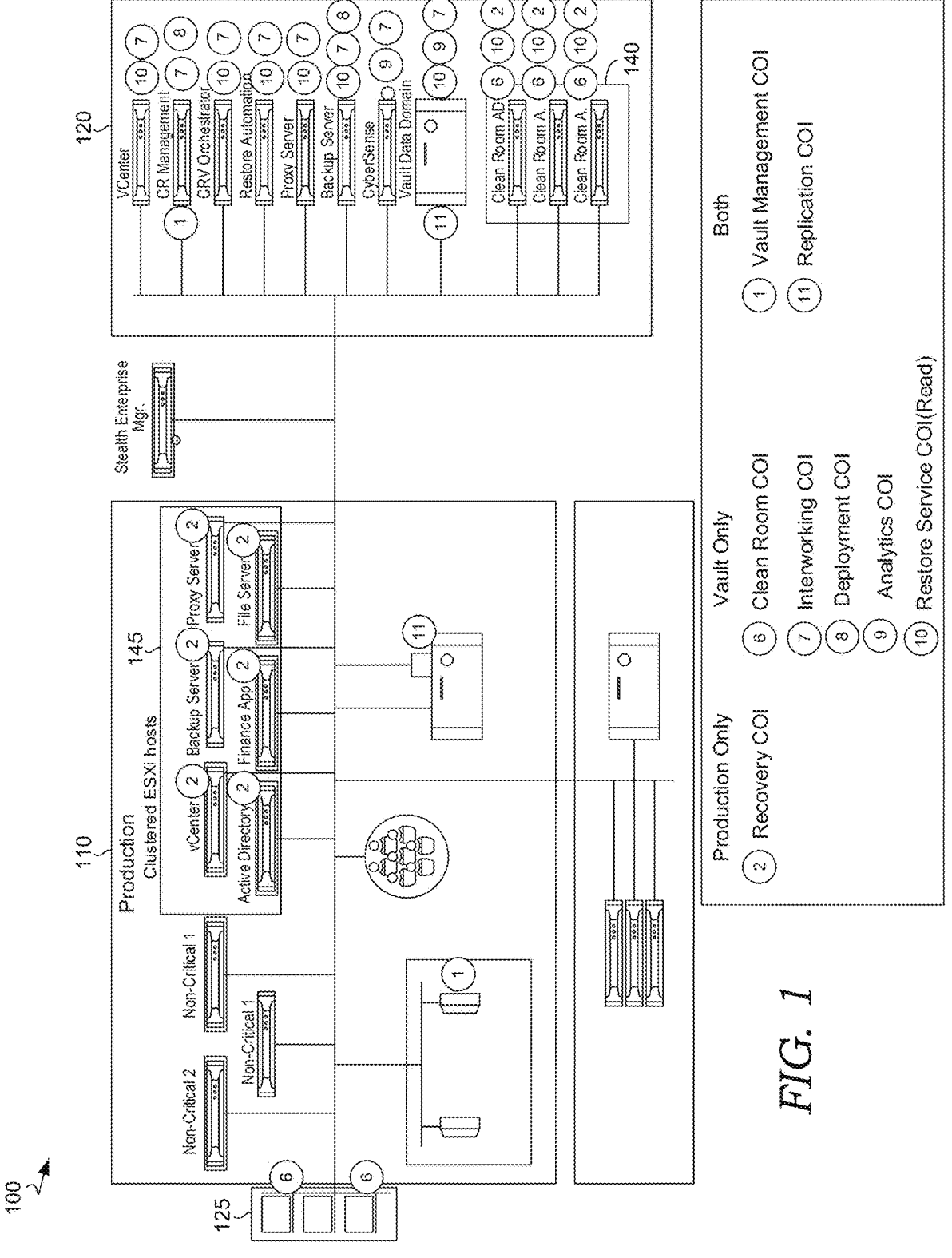
FIG. 1 is an example post-attack operating environment suitable for dynamically creating clean rooms and perform restores to corrupted production environments, in accordance with an aspect described herein.

Cyber recovery for an enterprise or agency is complex and can be subject to ever-evolving ransomware attacks. Organizations need effective solutions to identify and isolate critical assets from other assets and ensure a secure method to transfer applications and associated data stores between the vault and production environments. Critical assets, as used herein, refers generally to one or more systems/applications that contain organizational data that, if impacted, can put the organization at risk.

The introduction of micro-segmentation into cyber recovery solutions addresses several compliance requirements currently lacking in industry solutions. Specifically, the implementation of micro-segmentation introduces the following: controls damage impact by preventing east/west migration of malware both in the recovery vault as well as the production environment, provides protection via cloaking of inbound and outbound traffic as well as filtering for the relevant applications hosted on vault and production servers, isolates core business assets though micro-segmented enclaves (also referred to as Communities of Interests (COIs) and filtering and, prevents extreme data destruction or contamination by limiting the propagation of ransomware within the vault and/or the production environment. Effectively, the use of micro-segmentation technology allows for critical data to be securely isolated from other assets in the vault (during initial storage) as well as to create secured "clean rooms" within the existing production environments for secure recovery, as discussed in greater detail below. Using micro-segmentation, the present system can restore an identified application(s) into a micro-segmented secure enclave (i.e., COI) in production using an automated runbook. This allows for faster recovery in a controlled environment in an otherwise malware infested environment (i.e., a compromised/corrupt production environment), where the forensics are still being conducted and resolution of the security incident has not yet been completed. In other words, recovery into a compromised production environment is possible utilizing the present tooling as well as the overall concept of protecting vault components using secured enclaves or communities of interest (COIs) enabling a zero trust policy within a secure vault.

Existing approaches to cyber recovery include isolation via a logical air gap between the vault and a production environment. This protection schema is a minimal approach that fails to prevent the propagation of the ransomware within the vault and requires a complete, new production environment. Whereas, with micro-segmentation, a secured enclave within the existing production environment allows recovery software to significantly increase the recovery time for business continuance of the critical applications and associated data. Additionally, micro-segmentation for cyber recovery vaults takes cyber security of data to a higher level via core components such as asset cloaking and advanced data encryption. Typical attacks are listed below along with the effectiveness of micro-segmentation to address and/or remediate the impacts of the attacks.

TABLE 1

| Security Threats and Micro-Segmentation Effectiveness | | | |
|---|---|---|---|
| Cybersecurity Challenges Current State CRV | | | Effectiveness of Cyber Recovery with Micro- |
| Type of Attack | Reference Attacks | Probability | segmentation |
| Persistence/ Dormant Malware | Ransomware, WannaCry, Petya/NotPetya | High | Limits Proliferation |
| Insider Attack | Compromised credentials, Insiders become bad actors | Moderate/ High | Prevent, Limits Proliferation |
| Air Gap Bypass | Stuxnet | Low | Prevents |
| Data Theft | Ransomware | High | Limits Proliferation |

Current offerings in the cyber recovery business provide a singular connection to tertiary storage with software to detect malware. The current offerings are not concerned with how malware can propagate within the vault and have not considered how to restore business critical applications and data in the existing production environment.

The current approaches can compromise the Recovery Time Objectives (RTO) for critical applications and data and result in "newly" formed production environments. These "new" production environments come with associated increased costs and complexities to create a new production environment. Current approaches also fail to isolate critical assets from latent malware/ransomware. Thus, the use of micro-segmentation is advantageous to isolate critical assets from attack.

Micro-segmentation is an advanced software-defined security solution that uses encryption to enable multiple "secure communities" to share the same network without other groups being able to access—or even see—their workstations and servers. These Communities of Interest (COIs) enable logical segregation and isolation of network data and users without requiring multiple physical networks or inserting additional networking equipment such as firewalls, switches or routers. Micro-segmentation software solutions utilize identity-based key management for encryption. In those solutions, the COI keys are assigned based on user identity or device identity (in case of servers) rather than the IP address. In doing so, access rights are tied to the user, and are not dependent on the network topology. This invention includes the use of FIPS 140-2 compliant algorithms for encryption and key exchange. This makes it suitable for protecting sensitive data-in-motion for mission-critical enterprises. Assets protected with micro-segmentation do not respond to pings from non-COI members, cloaking them from unauthorized users. Additionally, unlike other security solutions that operate at the application layer, micro-segmentation solutions such as Unisys Stealth (hereafter referred to as Stealth), operates lower in the network protocol stack (i.e., OS level), making it transparent to applications and suitable for securing virtual machines (VMs) from other VMs on the same physical server.

As previously mentioned, the present solution can be further defined by the unique application of micro-segmented enclaves or COIs, which supports all aspects of the cyber recovery solution including (but not exclusive to) isolation of critical assets in the vault during storage/backup phase, the isolation of COIs specifically during analysis, as well as specified recovery and dynamic creation of "clean rooms" during recovery. The present solution relies on the unique creation of specific COIs for isolation of critical assets and speed of recovery. Establishment of secure COIs and COI keys allows for the sharing or accessing of data to endpoints that have been preconfigured with appropriate COI keys. Additional details on the creation of COIs can be found in U.S. Pat. No. 9,525,666, having a common assignee.

FIG. 1 is an exemplary recovery environment 100 in a post-attack scenario. The environment 100 includes a production environment 110 (which is a corrupted/compromised production environment as the scenario of FIG. 1 is post-attack), a vault 120, and one or more endpoints 125. The vault 120 includes a vault clean room 140 and the production environment 110 includes a production clean room 145. Each of the production environment 110 and the vault 120 include one or more COIs. Exemplary COIs, listed below, can be created for purposeful protection and recovery but COIs are configurable and can be established in many ways such that different components are part of many COIs, or different COIs, than illustrated herein.

Production Only COIs:
 Backup Management COI (not shown)
 Recovery COI (post-attack-illustrated as COI2 in FIG. 1)
 Backup Service COI (not shown)
 The Backup Management COI can initiate the backup process and restrict access to the backup management portal of the production environment. Backup Service COI enables communication on the production network between backup, data protect components (such as Dell's Data Domain), and a proxy server. Both of these COIs are embodied on the production side but are not illustrated in FIG. 1 for simplicity as FIG. 1 emphasizes a post-attack production environment. The Recovery COI (shown as COI 2 in FIG. 1) can enable system recovery communication on the production side. As is shown, COI2 (Recovery COI) is illustrated as including the vault clean room 140 of the vault 120 and the production clean room 145 of the production environment 110 (which is a corrupted production environment, as it is post-attack).

Vault Only COIs:
 Clean Room COI (COI6)
 Interworking COI (COI7)
 Deployment COI (COI8)
 Analytics/Analysis COI (COI9)
 Restore Service COI (COI10)
 The Clean Room COI (COI6) can grant access to vault clean room assets from the production side. In other words, the clean room COI can grant access to one or more assets of the vault clean room 140 to approved COIs of the production environment 110 such as, for instance, the recovery COI (COI2) of the production environment. As shown in FIG. 1, the components of both the production clean room 145 and the vault clean room 140 are members of the COI2. Thus, communication between the two is permissible in the environment 100.

The Interworking COI (COI7) can communicate with all vault systems with restricted communication only. Note that the interworking COI (COI7) cannot communicate with any components/assets within the vault clean room 140 since none of the vault clean room 140 components are located within COI7.

The Deployment COI (COI8) can enable communication between a recovery (CR) management component and a backup server (of the vault 120) for cleanup and to restore system creation commands. As shown in FIG. 1, only the backup server and the CR management component are within COI8. However, each of the CR management component and the backup server are also located within other COIs. Thus, they can communicate securely with one another, as well as other components that are members of a same COI.

Analytics COI (COI9) can analyze the backup process and restrict access to the Cyber Sense Web Management portal. The analytics COI9 comprises the Cyber Sense web management portal and the vault data domain, as shown in FIG. 1.

Restore Service COI (COI10) enables communication between various components illustrated in the vault 120 of FIG. 1. For instance, COI10 comprises the components of the vault clean room 140, as well as many other vault components including, but not limited to, the vault data domain, the proxy server, the backup server, etc.

A vault management COI (COI1) allows access to the management portal and is common to both the vault 120 and production environment 110. Similarly, a replication COI (COI11) replicates backups to the vault data domain (from the production data domain) and is common to both the vault 120 and production environment 110.

In addition to the COIs outlined above and general micro-segmentation principles utilized in the present solution, the technical architecture also utilizes critical principles supporting a Zero Trust compliant architecture. In particular, the present architecture ensures that all resources are accessed securely regardless of their location.

In a Zero Trust model, encrypted tunnels should be used for accessing data on both internal and external networks. Hence, internal systems should be protected from insiders much in the same way as external systems are protected on the Internet. A micro-segmentation technology, such as Unisys Stealth (core), uses FIPS 140-2 compliant encryption to secure data on internal networks. A Stealth-secured system on the internal network can only be accessed through an encrypted tunnel from a user or device belonging to the system's COI. Stealth drops incoming network packets that are not encrypted with matching COI keys. Unlike traditional virtual private networks (VPNs), which encrypt data only to the enterprise boundary, Stealth-based cyber recovery solution extends this encryption all the way to the server in the production datacenter as shown in FIG. 1. A Stealth-enabled system can only be accessed over an encrypted tunnel, irrespective of whether access is from within a data center or remotely from an endpoint such as a PC or mobile device or through a wrapped mobile application.

It is also important that the present solution adopt a least privilege strategy and strictly enforce access control. Zero Trust emphasizes proper implementation and enforcement of access control to secure restricted resources from unauthorized users. Relative to the present solution, micro-segmentation technology, such as Stealth, enforces access control through advanced cryptography. Only users or other servers belonging to a server's COI (such as the backup COI) can access that server. The server will not respond to pings or probes from non-COI members and is undetectable to all unauthorized users (such as latent malware from the ransomware attack). COIs are easily defined and managed, with a least privilege strategy, using the enterprise's identity management system, such as Active Directory or Lightweight Directory Access Protocol (LDAP).

As shown in FIG. 1, the separate COIs are represented by COI reference numbers (e.g., COI1,COI9, COI7, etc.). For instance, only machines in a preconfigured COI can communicate. If other machines attempt communication that do not have the necessary key, the target machine will drop the packet. This is how the machines affect cloaking and become invisible on the network. Network pings, Network Mapper (Nmap) and Zen Maps will not show any information about any machine that is part of COI. The result is security 'cloaking' that eliminates the reconnaissance phase of a cyberattack.

The present solution also inspects and logs all traffic, in accordance with Zero Trust principles. Zero Trust advocates two methods of gaining network traffic visibility: inspection and logging. By design, within the network, traffic is encrypted and hence the packet contents cannot be inspected by third-party tools without the encryption key. This solution attribute is aimed at preventing malicious users from eavesdropping on network data. Traffic can be inspected at endpoints by third-party tools that operate above the network layer. All network events such as tunnel creation, tunnel termination, COI assignment, and other events are logged by the micro-segmentation technology integrated with the cyber recovery solution.

Further, the present solution, in accordance with Zero Trust, requires that the solution applies authentication and authorization to every communication. With the addition of micro-segmentation technology, such as Unisys Stealth, all sessions are authenticated and authorization is enforced based on identity and the COI. Additionally, this application of micro-segmentation, supports per-session authentication since every communication between members of the backup and recovery COIs are mutually authenticated.

The present solution significantly adds to current cyber recovery solutions, which only replicate data and applications into an air-gapped vault, where its retention locked and analyzed for corruption. Specifically, the present solution incorporates advanced encryption, asset cloaking, and micro-segmentation, which underpins all zero trust-compliant requirements for both the vault data copies as well as the targeted recovery environment.

The application of Zero Trust principles to a cyber-recovery solution requires a comprehensive micro-segmentation solution that isolates critical assets from the rest of the cyber-recovery vault as well as dynamically creates a secure "clean room" in the targeted recovery environment (including current production datacenter). Micro-segmentation of the backup software ensures malware has not compromised the critical assets in the vault, the recovery application as well as the recovery environment.

Put another way, the solution isolates critical assets (critical applications, critical resources, etc.) in the vault separate from other vault components. For instance, the critical assets may be isolated in a vault clean room within a vault environment. When a security incident occurs, a secure clean room in a corrupted production environment is dynamically generated (in real-time) such that recovery of the vault clean room critical assets can begin as soon as possible after the attack and prior to the resolution of the attack. Attack resolution can comprise activities including sanitizing the production environment, auditing the environment, forensics, and the like. The present solution provides recovery of critical assets from a vault clean room to a production clean room during an attack (i.e., prior to resolution of the attack and/or during post-attack activities).

Additionally, micro-segmentation integration with a cyber-recovery solution safeguards a copy of critical data to enable rapid recovery for business continuance and enables fast recovery times by eliminating the need to failover to or generate a new alternate datacenter. The RTO for business recovery is critical following a targeted ransomware attack on the production data center and its backup/archived application data. This solution improves a user's security posture relative to ransomware attacks and significantly improves recovery times for true business continuance. In sum, the incorporation of micro-segmentation can: create a cyber-recovery environment invisible to hackers via cloaking; detect intrusion, isolate, and sanitize recovery systems quickly; restore data and systems into a secure and isolate "clean room" in the targeted recovery environment (in production); and streamline security and regulatory compliance by safeguarding against data theft, destruction, and ransom attacks.

Micro-segmentation is a valuable tool to safeguard data. However, the present solution seeks to provide an end-to-end solution that automates and streamlines the recovery process. Thus, the present solution also seeks to effectively identify critical assets and distinguish them from other assets, identify recovery objectives for the critical assets, and outline a technique for protecting those assets. A discovery tool, described herein, can identify critical applications, document the configuration, and arrive at the recovery objectives. While some discovery tool kits exist today, none address the issues solved by the present discovery tool including providing a platform to manage the critical assets, measure the recovery objectives for the critical assets, contain metadata of the critical assets to use in setting up the vault, reduce the manual efforts needed post-attack, provide comprehensive reports on critical assets, and provide plugins to reuse the discovery information for recovery automation in the future.

The discovery tool allows users to track their critical applications and associated resources identified from a discovery service or workshop relative to industry-standard recovery objectives including Recovery Point Objectives (RPO) and Recovery Times objectives (RTO). The discovery tool provides artifacts relative to front-end disaster recovery planning through to post-recovery audits. Visualization and reporting capabilities provide transparency by enabling approvals from authenticated users.

By identifying and isolating critical assets, a user (e.g., organization) is able to narrow the focus to critical applications, which enables visualization of the critical assets and reports of all dependent resources (including external systems). Critical assets are able to be stored as resources and components of critical applications as qualified by an approved user/role and easily associated with critical recovery objectives and requirements based on the asset classification from approved users/roles. The present discovery tool can also recommend backup frequency and schedule based on defined RPOs and RTOs for the critical assets and can recommend cyber security capacity requirements based on discovery information. Additionally, the discovery tool can document infrastructure and configuration details in a secure way for each of the components and assets identified.

The unique process and offerings of the discovery tool includes, in part, the below features:

Provision to capture the critical asset details in following methods:

Integrating with Standard IT Enterprise Discovery tools that exist today;

Importing details from standard templates; and

Entering the asset details manually.

Groups components and assets by Business-Critical Application of an Enterprise.

Measures Recovery objectives (RPO and RTO) for each of the resources.

Offers Approval Workflows for Assets to be approved by Business Owner.

Suggesting the Backup Schedules Frequency based on Recovery objectives.

Collects Meta Data of Production Assets that are used during Recovery and Restore.

Supports Dynamic configuration Screens to collect the meta data for any Data protection solutions (DPS) that are available in market such as Networker, Avamar, PPDM, etc.

Flexible to extend the Dynamic Configuration Screens for any Restore Capabilities for any Cyber Vault that exist in the Market Detailed description.

The discovery tool is used to identify and capture critical applications and its associated resources. The discovery tool defines an integrated data model for cyber recovery planning and implementation which includes data associated with critical applications including, but not limited to, the business owner(s) of the application, application owner(s), backup details, RTOs, and RPOs. The discovery tool also provides the ability to export the integrated data model to be consumed by the present solution or other third-party tools for recovery orchestration.

The discovery tool implements several services to manage the business-critical services. For example, users can capture information of identified critical application(s) and its resources. An application is a business service that is hosted on one or more resources. Resources can be multiple types including SQL server, Oracle, Microsoft Exchange, vmware, etc. The type of resources greatly impacts the restore process for each resource. For example, the backup content of each resource type is different, each resource type is accessed differently, each resource type is represented and backed up differently, etc. For Linux and Windows hosts either running on a physical machine or on a virtualization server as a VM, for instance, the backup content is a set of Filesystems (also called as Save sets). Alternatively, in a VMWare environment, the backup candidate can be a complete Virtual Machine, including its hard disks. Similarly, a database or an enterprise application resource-type have application-specific backup methods and processes.

FIG. 3 illustrates an exemplary environment 300 utilizing the discovery tool kit. The environment 300 includes a production environment 310, a discovery took kit 312, and a vault 314. The production environment 310 is illustrates as a typical production environment having storage systems 316, backup applications 318, and one or more assets illustrates as assets 324a-324d. Similarly, the vault 314 comprises storage systems 320 and backup applications 322.

The vault 314 further comprises a vault clean room 336, as described herein. The vault clean room 336 is shown to comprise one or more critical assets, such as critical asset 338 and critical asset 340.

The discovery took kit 312 comprises a critical application details component 326, a critical asset details component 328, a configuration details component 330, a critical assets database 332, and a reports component 334. Each of the components illustrated in the discovery tool kit 312 gather data regarding the critical application, critical asset, configuration thereof, and the like. Specifically, the critical application details component 326 gathers data regarding critical applications while the configuration details component 330 gathers configuration details of critical applications, critical assets, application resources, and the like.

The discovery tool implements several services to manage business-critical services. A user can capture information/details for critical applications and their resources. A user can define recovery objectives and, based on the type of resource and recovery objectives, the user can define backup requirements, which can then be used by a backup administrator to create and schedule backups for a given resource or application. Once the required information is captured, the user can choose an approver and post the information for a review. A report may be generated comprising the recovery objectives, type of resource, a backup schedule, etc.

Using the details captured by the discovery tool and analyzing the backup protection infrastructure, a reference architecture for the deployment of a cyber-recovery vault can be identified. For a given resource of an application, a user could retrieve backup configuration/parameters from a production backup server/application. Parameters may include latest backup status, a backup schedule, a backup target, etc.

Figure 4:
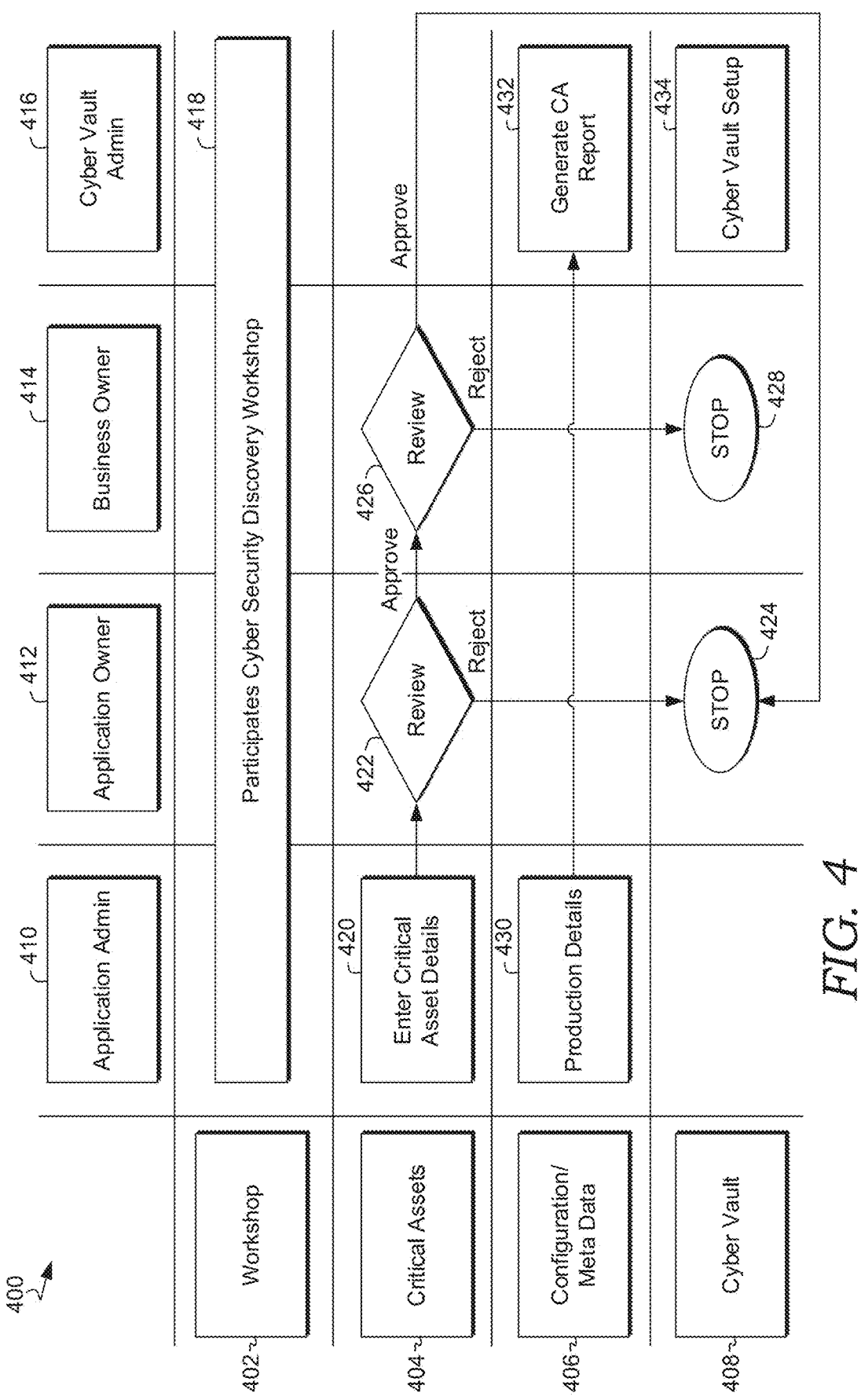
FIG. 4 illustrates an example method flow of a discovery tool workflow, in accordance with an aspect described herein.

Roles and assigned permissions have been identified to perform respective operations related to the discovery tool workflow, as shown in FIG. 4. Users may be registered and assigned roles such as role 410, role 412, role 414, and role 416. A role, as used herein, refers generally to a designation that defines privileges to access services and perform operations. Users can be authorized for standard security features including generating a token. The roles and permissions are configurable by a user to customize the discovery tool platform to the user's needs. As illustrated in FIG. 4, exemplary roles (e.g., roles 410-416) and permissions (shown as permission 402, 404, 406, and 408) are outlined and, as noted, may be customized by a user. For instance, an application administration role 410 may be able to create a new application and enter the details of critical assets at block 420 along with recovery objectives and production details at 430 while an application owner role 412 may be able to review the application details at block 422 to either approve or reject the submitted application. If rejected, the process proceeds to stop at block 424. If approved, the process continues on to a review at block 426 by role 414. The application owner role 412 can have authority to recommend resources being considered as critical and as candidates for backup to the vault. A business owner role 414 can manage a group of critical applications. The business owner role 414 can be notified of all application activities including adding a critical application, approval or denial of a critical application, etc. Once the business owner role 414 reviews 426 the details, the method can stop at block 428 if rejected or proceed to block 430 if approved. The production details are then sent to the cyber vault administrator role 416. A vault administrator role 416 may be able to enter both the production and recovery environment and resources configuration including data centers, resource names, IP address, recovery targets etc. The vault administration role 416 is a critical role and responsible for generating recovery reports at block 432, setup of the vault at block 434, and managing the recovery configuration.

The discovery tool has the ability to export the integrated data model for consumption by any other tool for recovery orchestration, including third-party tools. The present discovery tool, as described, provides end-to-end recovery including backup, replication, discovery, and infrastructure comprising micro-segmentation and communities of interest aligned with a zero trust architecture.

The present solution, thus, integrates the principles described above (e.g., micro-segmentation, Zero Trust, a unique discovery tool, etc.) in order to allow recovery of critical assets from a vault to a still-corrupted production environment. The present solution orchestrates the recovery process by encapsulating the complexity associating with planning and implementation of cyber-resilience to enable recovery in line with desired RTOs and RPOs within a recovery orchestrator tool. Data from the discovery tool may be imported into the orchestrator (i.e., the recovery orchestration tool) platform or the discovery tool can be added to the recovery orchestrator tool. The orchestrator tool can integrate human workflows for cyber-recovery operations due to the importance of recovery decisions. The orchestrator tool has the capability to define the order of restoration for one of more critical assets in a recovery process, ensure that the backed-up data is free from malware or ransomware, ensuring the integrity of the back-ups (accomplished by the micro-segmented production and vault environments along with zero trust principles and secure communities of interest), audit various activities including configuration or restore operations, define security configuration for restore and ensure that it is applied seamlessly during a recovery process, change/update the target environment for the restore, and the like. Employing the techniques described above, the present solution ensures that air-gapped vault components are secure and the back-ups cannot be tampered. The present solution also ensures that applications are restored within the RTOs RPOs to ensure minimal or no disruption to the business.

Table 2, provided below, provides a high-level scope of the recovery orchestrator tool. The following roles are defined as part of the cyber-recovery orchestrator tool but can be configurable by a user.

TABLE 2

| Orchestrator Tool Roles | |
| --- | --- |
| Role | Description |
| Application Owner | The Executive or senior leader accountable for the operations and security of the application |
| Application Admin | Technical administrator of the application with knowledge of the Application deployment and configuration details |
| Cyber Recovery Administrator | Responsible for monitoring and managing the cyber recovery applications and infrastructure |
| Cyber Security Consultants | Consultants (in-house) or third-party for design and implementation of Cyber-Vault and configuration of the runbooks |
| Business information Security officers | for the Business unit information security executive accountable for security including Data-Protection |

Figure 2:
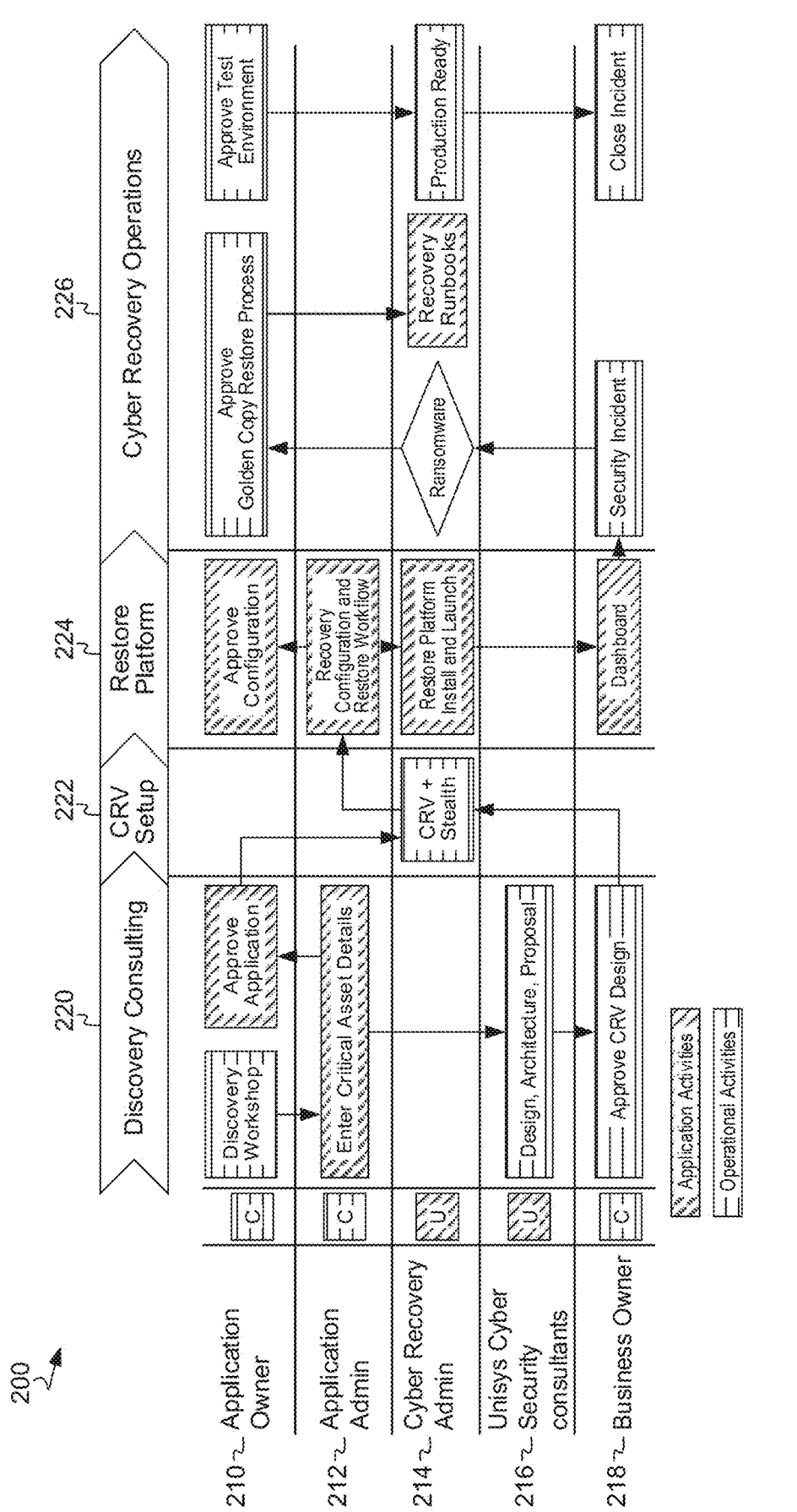
FIG. 2 illustrates an example method flow of a cyber-recovery vault platform, in accordance with an aspect described herein.

Turning now to FIG. 2, an exemplary method 200 illustrates the end-to-end process of the present solution. Initially, several user-configurable roles are identified by roles 210, 212, 214, 216, and 218. Additionally, a plurality of components are outlined as being associated with various responsibilities discussed above. Specifically, FIG. 2 illustrates a discovery component 220 (e.g., discovery tool), a vault setup component 222, a restore platform 224, and recovery operations 226. Initially, the process to approve an application (as shown in FIG. 4) is generally performed by the discovery tool. As is shown, critical asset details can be added. Once the critical applications are identified as part of the discovery consulting process (via the discovery tool), the application administrator can add an application and the corresponding details using an Orchestrator Dashboard of the orchestrator tool. Information including an application owner, a business owner, a description and business justification for the addition, and the like, may be captured. Using the details, a design, architecture, and proposal of a cyber-recovery vault is identified and approved in the discovery phase 220. The cyber-recovery vault can be created as shown by the steps where the configuration is approved, the platform is installed and launched, etc. A security incident is then identified which launches the recovery operations 226 phase. Upon identifying there is no ransomware, the restore process is approved and automated runbooks can be run for recovery. The test environment is then approved and the production environment is determined ready. The incident is closed upon validating the production environment is ready.

As described above, each application can consist of one or more resources. Details captured can comprise a resource owner, a description, a usage (production/pre-production), a resource back-up type (e.g., File system, VM Image or application), SLAs (e.g., RPO and RTO), and VCenter IP address. Additional information that may be captured includes the backup schedule. This backup schedule can be used to ensure the restore configuration can support the relevant SLAs.

Once the above data is collected, it should be approved by the application owner. This is enabled via the human-workflow built into the tool. Once the data is approved, the customer can ensure that configuration data is used to build the Cyber-recovery vault.

The cyber-vault, which is an air-gapped data vault, can be setup using consultation services depending on the vault software being used. The application back-up tools currently deployed by the enterprise/user are configured to schedule the replication to the Cyber-vault with appropriate frequency to enable meeting the Recovery time objectives (RTOs) and Recovery point objectives (RPOs). The Cyber-Vault can include malware detection and analysis software to detect any anomalies in the data being replicated and ensures that only clean backups are available for restoration. The Cyber-Recovery Vault setup includes installation of the recovery orchestrator tool. The recovery orchestrator tool is protected using micro-segmentation (described above) to enable only network access to the configured infrastructure in a zero-trust configuration. Any malware or anomaly in replication may be flagged and the event can be monitored by the recovery orchestrator tool and can be flagged to an approved user (e.g., the cyber-recovery administrator).

As noted, the recovery orchestrator tool can be installed in the cyber recovery vault. The restore configuration for each of the applications is dependent on the backup tool used for backing up the application data in the production environment. The recovery orchestrator tool can provide the flexibility to choose the back-up tool per application. The recovery orchestrator tool can allow the recovery admin to choose the backup tool instance from a drop-down and the corresponding data store (MTree in the case of the Data-Domain) can be identified for the application resource being configured. Both the production and the vault data targets are configured.

The recovery orchestrator tool enables the restore using built-in workflows (Workbooks) which, in turn, are built using pre-defined templates for the supported back-up tools (Networker, Avamar) and server infrastructure (vCenter). The application restore configuration is dependent on the following: type of the resources (VMWare VM, File-system resource, or application); backup S/W used for production applications (Networker/Avamar or other 3rd party); type of restore (e.g., VM Image transfer, Restore a VM Image to a vCenter, Instant Restore a VM Image to a vCenter (datastore is DD), Migrate a VM to a different vCenter or host or datastore, Filesystem restores to a host, etc.).

The restore configuration involves choosing the restore workflow. The following restore options exist:

Restore to a Clean room (vCenter) in a vault;

Restore to Production vCenter; and

Restore to Clean room with integrated security.

Once the base-workflow is chosen, the restore details may be configured. The restore details may include the target destination (e.g., vCenter and appropriate cluster data) where the backup data is to be restored in the production/clean room. Additional information such as ESXi host details and power-on and network configuration details of the VM may also need to be configured. Once configured, the application owner (or other approved role) can log-in to the recovery orchestrator tool and review the configured workflow and can activate the same by approving the workflow.

The recovery orchestrator tool can also configure the Stealth Security endpoint into the recovered VMs. This enables restore of virtual machines to the production with zero-trust security. This feature allows the ability to create a secure enclave within a compromised production environment.

In the event of an alert on the security dashboard (e.g., a security incident) due to malware/anomaly detection during a replication activity, the cyber recovery administrator role (or any other approved role) can approve a decision to restore the application in conjunction with the application owner (or other approved role).

The recovery process can be initiated by identifying an application (or associated resource) and a restore option. An available backup based on the RTO and RPO parameters previously configured may also be identified. The application can be restored successfully without additional user input (e.g., no manual intervention).

The recovery orchestrator tool is unique as it provides the restoration capability in an integrated and vendor-agnostic manner. This allows for newer backup tools to be configured as long as they provide APIs for integration.

Figure 5:
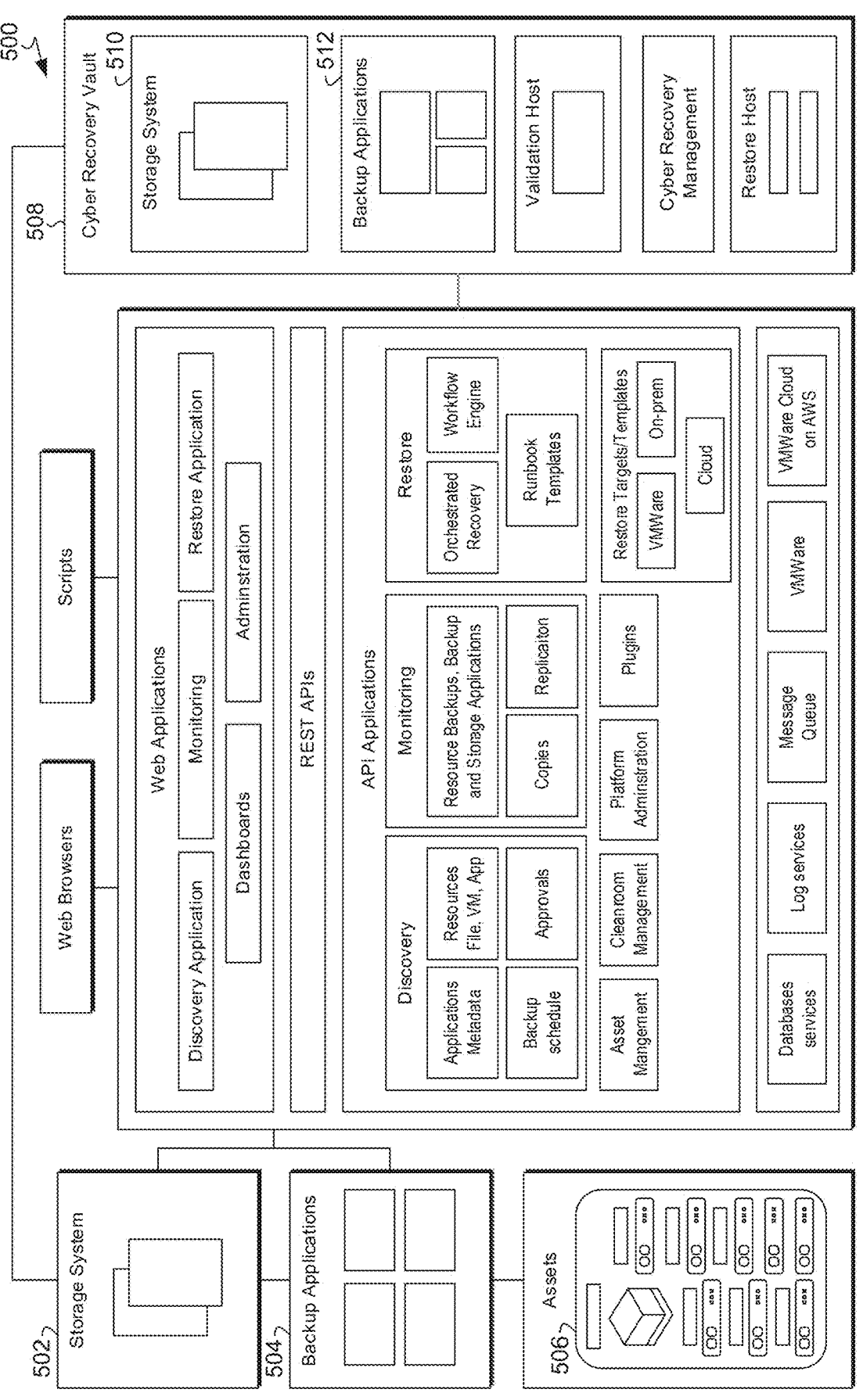
FIG. 5 illustrates an example operating environment suitable for dynamically creating clean rooms and perform restores to corrupted production environments, in accordance with an aspect described herein.

Turning now to the architecture 500 of the orchestrator tool, as shown in FIG. 5. A cyber-recovery vault 508 is shown along with a corresponding storage system 510 and backup applications 512. Similarly, a storage system 502, backup applications 504, and one or more assets 506 of a production environment are illustrated. The solution uses a set of pluggable wrapper services called plugins to communicate with data protection services, cyber recovery components, and infrastructure. The services, including plugins, expose RESTful APIs which are available to web applications and other services and scripts. Following are some of the plugins available in the recovery orchestrator. The following are exemplary in nature and not intended to limit the available plugins for the recovery orchestrator.

Backup application plugins—A plugin is implemented for each backup application type. The plugin exposes a set of RESTful APIs for web application and other services. The plugin can register a respective backup application to the platform. The plugin helps to retrieve backup and protection parameters for a given resource (resource can be Filesystem, VMWare VM, database, or other enterprise application), and retrieve resource backups details with destination of a data domain where the backups are stored.

Cyber recovery plugins—The cyber-recover plugins register cyber-recovery applications. The plugin helps to monitor cyber recovery vault health, vault operations, health of the MTree copies, and the like. The plugin handles initialization, restore and configuration of the backup application in the vault, from which restore service can restore a given resource based on restore workflows.

Plugin for Stealth services—If installed, based on the restore workflow, the plugin for Stealth services protects the restored resource by installing an endpoint agent and/or by applying Stealth policies.

Configuration service—The configuration service is the core service to which the plugins are registered. The configuration service defines independent and generic interfaces for the plugins to work with each other and transforms the data and requests that are specific to an external service to a generic form that can be consumed by other services.

Restore service—The restore service is an orchestration service that performs a series of steps coordinating with a workflow automation platform (e.g., Camunda) to execute restore workflows. Restore platform hosts multiple workflow templates that can be assembled together to define a workflow to restore a resource.

Monitor service—The monitor service is a service that would communicate with plugin services to monitor health and status of services and backups.

Identity and Access Management—Access to Cyber Recovery management and operations are controlled by an identity and access management platform, such as Keycloak. The services would be registered to Keycloak as clients for authentication and role-based authorization.

The orchestrator can use Camunda engine as the Business Process Model and Notation (BPMN) workflow engine to build reusable templates for various activities required in a restoration runbook. Newer templates can be developed to support various customer restoration needs. The following are some of the examples.

Workflow Template, WT1>Restore a VM Image to a vCenter

Workflow Template, WT2>Instant Restore a VM Image to a vCenter (datastore is DD)

Workflow Template, WT3>Install Stealth Endpoint Agent

Restore workbooks can use multiple workflow templates described above to create the overall application restore runbooks. The configuration service can implement a set of REST APIs to manage workflow templates and help to build a workbook for restore using a workflow and decision automation platform (e.g., Camunda). Availability of the templates can also be based on the backup type and on the plugins installed and registered with the platform.

Workbook, WB1 can be created using templates WT1 and WT3.

$$WB1 = WT1 + WT3$$

The workflow templates, in turn, invoke various plugins as part of the runtime execution using the parameters configured for the particular restore configuration instance for the application resource.

Figure 6:
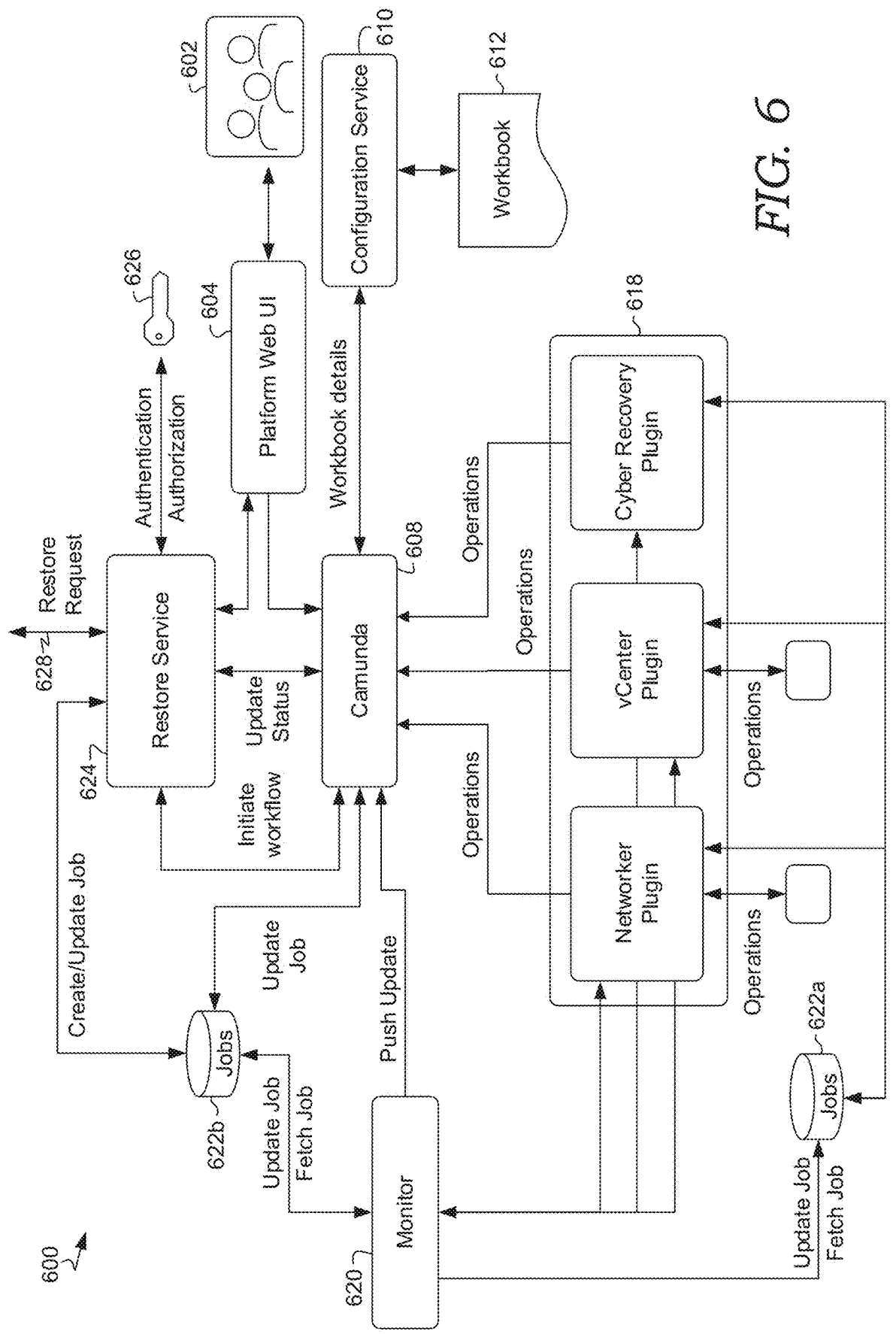
FIG. 6 illustrates an example operating environment suitable for dynamically creating clean rooms and perform restores to corrupted production environments, in accordance with an aspect described herein.

The restore service is one of the core services of the recovery orchestrator and is handled by a restore service component 624, as shown in FIG. 6. It can collaborate with Camunda 608, for instance, to perform orchestrated recovery of an application by restoring one or more resources of the application from the vault. FIG. 6 depicts the overall execution of the workbook enabled by the restore service. An identity and access management platform 626, such as Keycloak, can be associated with the restore service 624. The services can be registered to the identity and access management platform 626 as clients for authentication and role-based authorization.

The restore of a resource is defined by the associated restore workbook 612. The restore workbook 612 is a set of workflows, where each workflow defines a set of operations that needs to be performed for restoring the resource. The workbooks 612 defining the restore are available via a configuration service 610 that collaborates with Camunda 608. The operations can be delegated to respective plugins 618 to perform the action or may be delegated as the operation needs user intervention or to make a decision based on the state of the resource and services.

The restore service 624 can initiate the restore operation (from a restore request 628) by creating a job 622a or job 622b for monitoring and triggering Camunda 608 by passing along workbook parameters. Camunda 608 can, based on the workflows associated with the resource, gather the data required to perform each workflow operation. Camunda 608 can delegate the operation to perform to a respective plugin 618 and wait for completion. The respective plugin 618 can initiate the operation and record the job for the monitoring service 620 to monitor the progress. Once the job is completed, the monitor service 620 can notify Camunda 608 about the status to take next action in the workflow. Workflow updates are also available via a platform web interface 604 to one or more users 602.

The orchestrator tool provides a vendor-agnostic extensible plugin library for various backup tools and deployment infrastructure like VMWare as well as the ability to define application restore (workbooks) and choose the corresponding workflow templates based on the type of recovery and backup-tools. This tool can provide a one-click restore instead of cumbersome set manual steps typically involved in a restore operation. The recovery orchestrator is unique, industry first orchestration tool for end-to end automation of cyber recovery enabling customers to de-risk their business from the ransomware attacks and add cyber resiliency to their enterprise applications.

Turning to FIG. 7, an example method 700 is provided. In this example, an indication that a security incident is occurring is received at block 710. The security incident, as used herein, refers generally to a cyber-attack on a system that corrupts an environment (e.g., a production environment) and creates a corrupted environment. A clean copy of each of a plurality of critical assets is identified at block 720. A critical asset, as used herein, refers generally to an asset (e.g., an application, an application resource, etc.) that is flagged as needing to be prioritized during a cyber-recovery effort to be restored to the production environment. At block 730, a clean room is dynamically generated in the corrupted production environment. At block 740, a secure connection is established between the clean room in the corrupted production environment and a clean room in a vault. Once the secure connection is established, the clean copy of each of the plurality of critical assets is transmitted, at block 750, from the clean room in the vault to the clean room in the corrupted production environment. The clean copies are transmitted to the corrupted production environment prior to resolution of the security incident (i.e., the production environment is still corrupted/compromised and/or cyber-recovery steps (e.g., sanitizing, auditing, etc.) are not all complete).

Turning to FIG. 8, an example method 800 is provided. Initially, at block 810, an indication of one or more applications to recover is received. The indication, in this example, is an application to recover, but in other examples, could be an application resource. At block 820, an indication of a restore option for each of the applications to be recovered is received. Restore options can vary for applications, application resources, and the like. At block 830, an available backup for each of the applications to be recovered is identified. The available backup may be identified from a vault clean room. A clean room in a corrupted production environment is dynamically generated at block 840 in order to have a secure location in which to restore the one or more applications. At block 850, the available backup for each of the applications is restored from a vault clean room to the clean room in the corrupted production environment prior to resolution of a security incident that compromised the production environment (e.g., a cyber attack).

Figure 9:
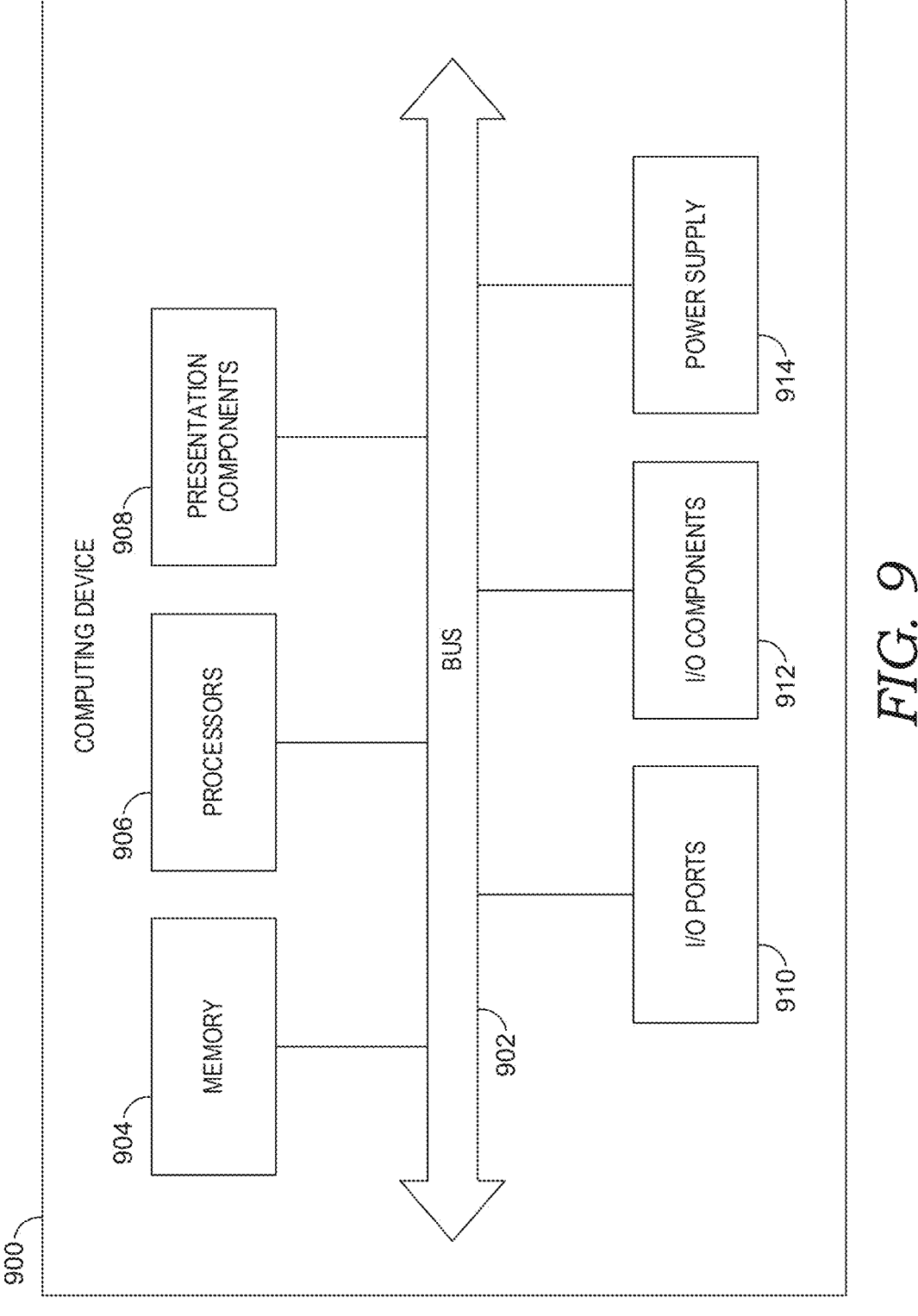
FIG. 9 illustrates an example computing device that may execute operations for dynamically creating clean rooms and perform restore operations for a corrupted production environment, in accordance with an aspect described herein.

Having described an overview of some embodiments of the present technology, an example computing environment in which embodiments of the present technology may be implemented is described below in order to provide a general context for various aspects of the present technology. Referring now to FIG. 9 in particular, an example operating environment for implementing embodiments of the present technology is shown and designated generally as computing device 900. Computing device 900 is but one example of a suitable computing environment and is not intended to suggest any limitation as to the scope of use or functionality of the technology. Computing device 900 should not be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules, including routines, programs, objects, components, data structures, etc., refer to code that performs particular tasks or implements particular abstract data types. The technology may be practiced in a variety of system configurations, including handheld devices, consumer electronics, general-purpose computers, more specialty computing devices, etc. The technology may also be practiced in distributed computing environments where tasks are performed by remote-processing devices that are linked through a communications network.

With reference to FIG. 7, computing device 900 includes bus 902, which directly or indirectly couples the following devices: memory 904, one or more processors 906, one or more presentation components 908, input/output (I/O) ports 910, input/output components 912, and illustrative power supply 914. Bus 902 represents what may be one or more buses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 9 is merely illustrative of an example computing device that can be used in connection with one or more embodiments of the present technology. Distinction is not made between such categories as "workstation," "server," "laptop," "handheld device," etc., as all are contemplated within the scope of FIG. 7 and with reference to "computing device."

Computing device 900 typically includes a variety of computer-readable media. Computer-readable media can be any available media that can be accessed by computing device 900 and includes both volatile and non-volatile media, and removable and non-removable media. By way of example, and not limitation, computer-readable media may comprise computer storage media and communication media. Computer storage media, also referred to as a communication component, includes both volatile and non-volatile, removable and non-removable media implemented in any method or technology for storage of information, such as computer-readable instructions, data structures, program modules, or other data. Computer storage media includes, but is not limited to, RAM, ROM, EEPROM, flash memory, or other memory technology; CD-ROM, digital versatile disks (DVDs), or other optical disk storage; magnetic cassettes, magnetic tape, magnetic disk storage, or other magnetic storage devices; or any other medium that can be used to store the desired information and that can be accessed by computing device 900. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 904 includes computer storage media in the form of volatile or non-volatile memory. The memory may be removable, non-removable, or a combination thereof. Example hardware devices include solid-state memory, hard drives, optical-disc drives, etc. Computing device 900 includes one or more processors that read data from various entities, such as memory 904 or I/O components 912. Presentation component(s) 908 presents data indications to a user or other device. Example presentation components include a display device, speaker, printing component, vibrating component, etc.

I/O ports 910 allow computing device 900 to be logically coupled to other devices, including I/O components 912, some of which may be built-in. Illustrative components include a microphone, joystick, game pad, satellite dish, scanner, printer, wireless device, etc. The I/O components 912 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition, both on screen and adjacent to the screen, as well as air gestures, head and eye tracking, or touch recognition associated with a display of computing device 900. Computing device 900 may be equipped with depth cameras, such as stereoscopic camera systems, infrared camera systems, RGB (red-green-blue) camera systems, touchscreen technology, other like systems, or combinations of these, for gesture detection and recognition. Additionally, the computing device 900 may be equipped with accelerometers or gyroscopes that enable detection of motion. The output of the accelerometers or gyroscopes may be provided to the display of computing device 900 to render immersive augmented reality or virtual reality. Power supply 914 may be any power supply suitable for computing device 900 or components thereof.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low-level software written in machine code; higher-level software, such as application software; and any combination thereof. Any other variations and combinations thereof are contemplated within embodiments of the present technology.

With reference briefly back to the previous figures, it is noted and again emphasized that any additional or fewer components, in any arrangement, may be employed to achieve the desired functionality within the scope of the present disclosure. Although the various components of FIG. 1 or 5, for instance, are shown with lines for the sake of clarity, in reality, delineating various components is not so clear, and metaphorically, the lines may more accurately be grey or fuzzy. Although some components of FIGS. 1-6 are depicted as single components, the depictions are intended as examples in nature and in number and are not to be construed as limiting for all implementations of the present disclosure. The functionality of the general operating environment can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIGS. 1-6 are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including," "having," and other like words and their derivatives have the same broad meaning as the word "comprising," and the word "accessing" comprises "receiving," "referencing," or "retrieving," or derivatives thereof. Further, the word "communicating" has the same broad meaning as the word "receiving" or "transmitting," as facilitated by software or hardware-based buses, receivers, or transmitters using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment. However, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well-adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated by the accompanying drawings is to be interpreted as illustrative and not in a limiting sense.

What is claimed is:

1. A computer-implemented method of restoring one or more critical assets to a production environment, the method comprising:

receiving an indication a security incident is occurring, wherein the security incident corrupts the production environment and creates a corrupted production environment;

identifying a clean copy of each of a plurality of critical assets, wherein a critical asset is an asset that is flagged as prioritized during a cyber-recovery to restore to the production environment;

dynamically generate a clean room in the corrupted production environment;

establishing a secure connection between the clean room in the corrupted production environment and a clean room in a vault, wherein the secure connection utilizes zero trust principles, and wherein the production environment and the vault are micro-segmented into a plurality of communities of interest; and transmitting, to the clean room in the corrupted production environment, the clean copy of each of the plurality of critical assets.

2. The computer-implemented method of claim 1, wherein the clean copy is transmitted from a clean room in the vault.

3. The computer-implemented method of claim 2, wherein the clean room in the vault is separate from any other vault components.

4. The computer-implemented method of claim 1, wherein components communicate with other components in a same community of interest and cannot communicate with components in a different community of interest.

5. The computer-implemented method of claim 4, wherein the clean room in the vault and the clean room in the corrupted production environment are each in a same community of interest.

6. One or more computer storage media storing computer-readable instructions thereon that, when executed by a processor, cause the processor to perform operations comprising:

receiving an indication a security incident is occurring, wherein the security incident corrupts the production environment and creates a corrupted production environment;

identifying a clean copy of each of a plurality of critical assets, wherein a critical asset is an asset that is flagged as prioritized during a cyber-recovery to restore to the production environment;

dynamically generate a clean room in the corrupted production environment;

establishing a secure connection between the clean room in the corrupted production environment and a clean room in a vault, wherein the production environment and the vault are micro-segmented into a plurality of communities of interest; and transmitting, to the clean room in the corrupted production environment, the clean copy of each of the plurality of critical assets.

7. The one or more computer storage media of claim 6, wherein the clean coy is transmitted from a clean room in the vault.

8. The one or more computer storage media of claim 7, wherein the clean room in the vault is separate from any other vault components.

9. The one or more computer storage media of claim 6, wherein the secure connection utilizes zero trust principles.

10. The one or more computer storage media of claim 6, wherein components communicate with other components in a same community of interest and cannot communicate with components in a different community of interest.

11. The one or more computer storage media of claim 6, wherein the clean room in the vault and the clean room in the corrupted production environment are each in a same community of interest.

* * * * *